United States Patent [19]
Miura et al.

[11] Patent Number: 5,485,238
[45] Date of Patent: Jan. 16, 1996

[54] PHOTOGRAPHING INFORMATION SETTING DEVICE FOR CAMERA

[75] Inventors: Kosho Miura, Funabashi; Naoki Kitaoka, Tokyo, both of Japan

[73] Assignee: Nikon Corporation, Tokyo, Japan

[21] Appl. No.: 299,797

[22] Filed: Sep. 1, 1994

Related U.S. Application Data

[63] Continuation of Ser. No. 984,525, Dec. 2, 1992, abandoned.

[30]    Foreign Application Priority Data

Dec. 6, 1991  [JP]  Japan ..................... 3-323008

[51] Int. Cl.⁶ .............................. G03B 17/00; G03B 7/08
[52] U.S. Cl. ......................... 354/289.12; 354/442
[58] Field of Search ........................ 354/289.1, 289.11, 354/289.12, 21, 486, 442

[56]          References Cited

U.S. PATENT DOCUMENTS

| | | | |
|---|---|---|---|
| 4,890,134 | 12/1989 | Fujino et al. | 354/442 |
| 5,128,704 | 7/1992 | Hayashi et al. | 354/289.1 |
| 5,189,466 | 2/1993 | Yasukawa et al. | 354/412 |
| 5,210,569 | 5/1993 | Harada | 354/442 |
| 5,223,888 | 6/1993 | Fukahori | 354/475 |

FOREIGN PATENT DOCUMENTS

| | | |
|---|---|---|
| 60-118825 | 6/1985 | Japan . |
| 3-32049 | 5/1991 | Japan . |

*Primary Examiner*—Michael L. Gellner
*Assistant Examiner*—Nicholas J. Tuccillo
*Attorney, Agent, or Firm*—Shapiro and Shapiro

[57]          ABSTRACT

A photographing information setting device includes a first photographing information signal generator for releasing a first signal for varying a photographing information by a predetermined step, in response to the operation of an externally operable first operation member; a second photographing information signal generator for releasing a second signal for varying a photographing information by a step larger than the predetermined step mentioned above, in response to the operation of an externally operable second operation member, which indicates the set photographing information by the operated position thereof; and a signal generator for generating a third signal instead of the second signal when the second operation member is set at a predetermined position. In the device, a photographing information according is set to the first signal when the third signal is generated, or according to the second signal when the third signal is not generated.

20 Claims, 8 Drawing Sheets

PHOTOGRAPHING INFORMATION SETTING DEVICE FOR CAMERA

This is a continuation of application Ser. No. 07/984,525 filed Dec. 2, 1992, now abandoned.

BACKGROUND OF THE INVENTION

1. Field of the Invention

The present invention relates to a photographing information setting device, for entering photographing information such as shutter speed and diaphragm aperture, for use in a camera.

2. Related Background Art

For setting photographing information of a camera, such as shutter speed and diaphragm aperture, and entering such information into the control means of the camera, there is already known a method of manually rotating a rotary operation member on which the shutter speeds or diaphragm aperture values are printed, whereby a variable resistor linked with said operation member is rotated and the shutter speed or the diaphragm aperture value is set by reading the resistance of such variable resistor.

However, in order to improve the precision of setting within a limited space of the camera, such method requires a compact variable resistor of a high precision, thus leading to an increased cost. Also technology of a high level is required for mounting the brush, linked with the rotary operation member and contacting a resistance member, so as to achieve a precise sliding motion, thus again leading to an increased cost.

Also there has been developed a method of employing a code board instead of the variable resistor, thereby setting the photographing information in the form of digital signals instead of the change in resistance, but such method inevitably requires a large-sized code board if the amount of information increases, thereby rendering the camera itself bulky.

For this reason there has also been developed, as disclosed in the Japanese Patent Laid-open Application No. 60-118825 and No. 3-32049, a method which employs a rotary operation member, means for detecting the drive direction of the operation member by discriminating the phases of two signals mutually different in phase, and a display unit for displaying the currently set photographing information, and in which the desired photographing information can be set by regulating the set value by the rotation of the operation member while confirming the set value on the display unit.

In this method, since the rotary operation member is separate from the display part of the display unit, the number of rotations of the operation member is not limited and there can be provided a large number of selectable set values. Consequently, there is facilitated the setting of intermediate values, which has been difficult with the information setting device mentioned above.

However, in such photographing information setting device of the camera, since the display unit usually utilizes a liquid crystal display or the like, the displayed information cannot be read unless the power supply of the camera is turned on. Consequently, the power supply of the camera has to be turned on in order to confirm the photographing information, so that the operation of the camera becomes complex.

Also, if the number of selectable set values is increased excessively, the photographer has to rotate the operation member by a number of turns in order to set the desired photographing information, so that the setting of photographing information within a short time becomes difficult.

SUMMARY OF THE INVENTION

The present invention is intended to resolve such drawbacks in the prior art, and its an object of the invention is to provide a photographing information setting device, for use in a camera, enabling secure, rapid and precise setting of the photographing information according to the purpose, and allowing a photographer to confirm photographing information regardless of whether the power supply of the camera is turned on or off.

A photographing information setting device for a camera, according to the present invention, comprises;

a first photographing information signal generator for releasing (out putting) a first signal for varying the photographing information by a predetermined step, in response to the operation of an externally operable first operation member;

a second photographing information signal generator for releasing a second signal for varying the photographing information by a step larger than said predetermined step, in response to the operation of an externally operable second operation member, which indicates the set photographing information by the operated position thereof;

a signal generator for generating a third signal instead of the second signal when the second operation member is set at a predetermined position; and photographing information setting means adapted for setting the photographing information either according to the first signal when the third signal is generated, or according to the second signal when the third signal is not generated.

In the above-mentioned photographing information setting device, if highly precise photographing information is not required, the second signal is generated only by the operation of the externally operable second operation member bearing the photographing information in directly readable form, and the photographing information is set according to said second signal. On the other hand, if highly precise photographing information is required, the second operation member is set at a predetermined position to generate the third signal, and the photographing information is set according to the first signal generated by the operation of the externally operable first operation member.

Preferably said first signal is an addition or subtraction signal generated according to the amount of operation of the first operation member, and the photographing information is varied according to said signal.

The information set by the device of the present invention may be the shutter speed, the diaphragm aperture value and the like.

DETAILED DESCRIPTION OF THE PREFERRED EMBODIMENTS

Now the present invention will be clarified in detail by preferred embodiments thereof shown in the attached drawings.

Figure 1:
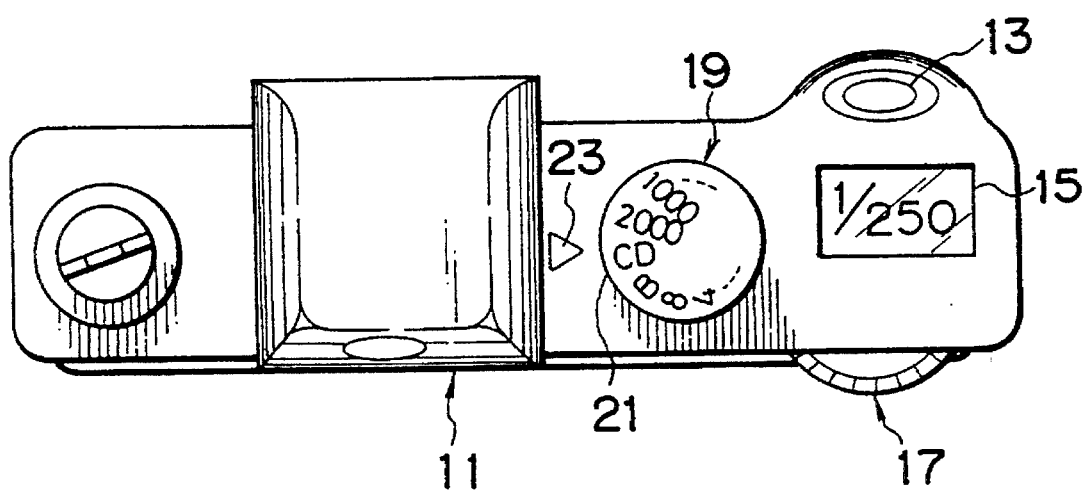
FIG. 1 is a plan view of a camera, equipped with an embodiment of the photographing information setting device of the present invention.

FIG. 1 shows a camera equipped with an embodiment of the photographing information setting device of the present invention.

On the upper face of a camera body 11, there are provided a shutter release button 13, and a photographing information display unit 15, consisting of a liquid crystal display, for displaying the shutter speed.

There are further provided a first shutter dial 17 and a second shutter dial 19.

On said second shutter dial 19, there are visibly printed various shutter speeds and an index "CD" 21.

Also a position indicator 23 is printed on the camera body, at a side of the second shutter dial 19.

Figure 2:
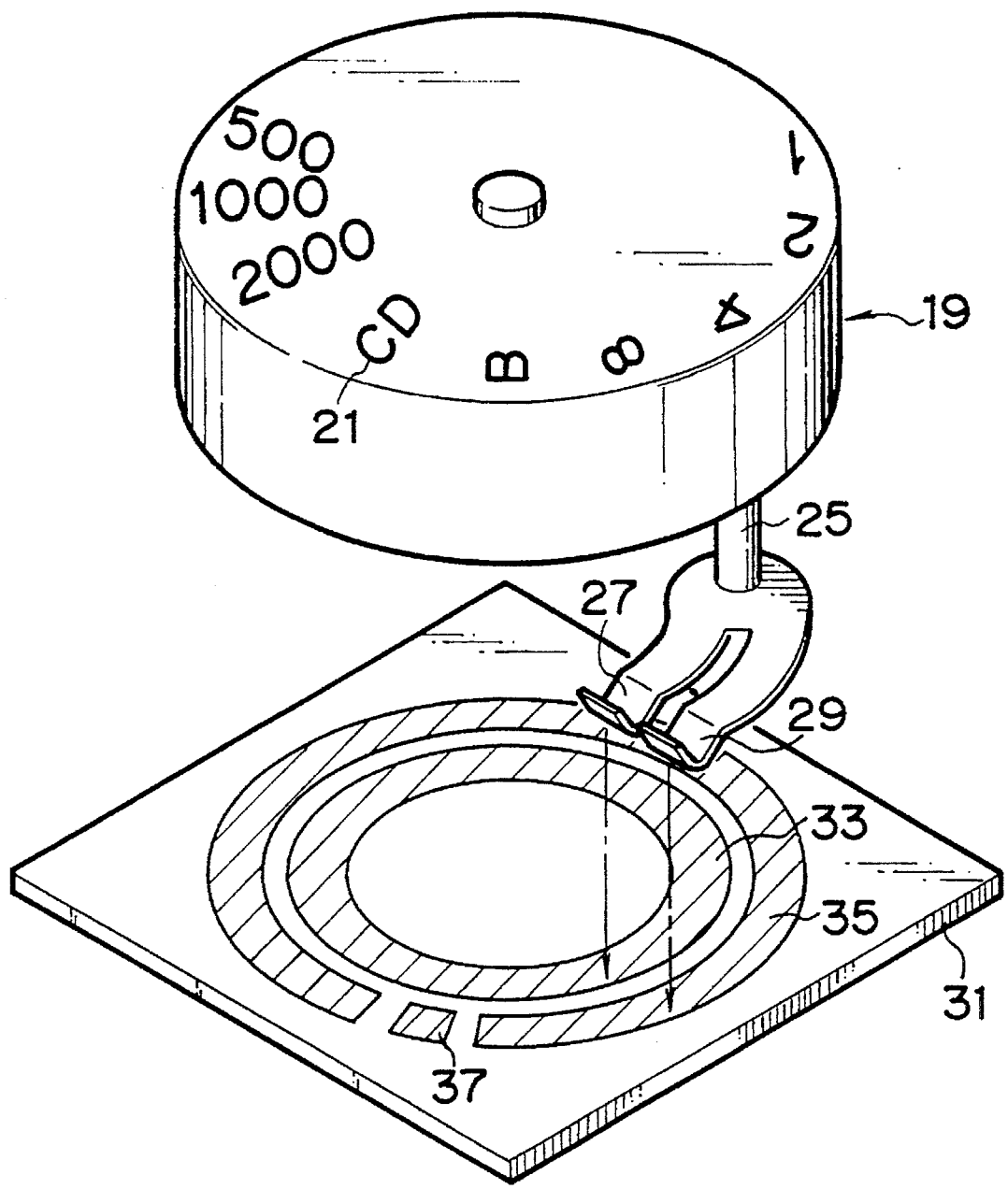
FIG. 2 is a perspective view of a second shutter dial shown in FIG. 1 and a variable resistor.

FIG. 2 shows the details of said second shutter dial 19, which bears, through a shaft therebelow, a pair of electrically connected brushes 27, 29.

Under said brushes 27, 29 there is provided a board 31 bearing a grounding pattern 33 and a resistor pattern 35 formed in concentric manner.

Said resistor pattern 35 is interrupted in a predetermined position, and an index pattern 37 is formed in said interrupted area.

When the index 21 of the second shutter dial 19 is not positioned at the position indicator 23, the brushes 27, 29 are in contact with the grounding pattern 33 and the resistor pattern 35. In response to the rotation of the second shutter dial 19, said brushes 27, 29 slide on the grounding pattern 33 and the resistor pattern 35, thereby constituting a variable resistor, and the shutter speed is calculated and set according to the resistance of said variable resistor.

On the other hand, when the index 21 is located at the position indicator 23, the brushes 27, 29 are in contact with the grounding pattern 33 and the index pattern 37, which activates a circuit for enabling the first shutter dial 17, whereby the shutter speed settling by the first shutter dial 17 is enabled.

Figure 3:
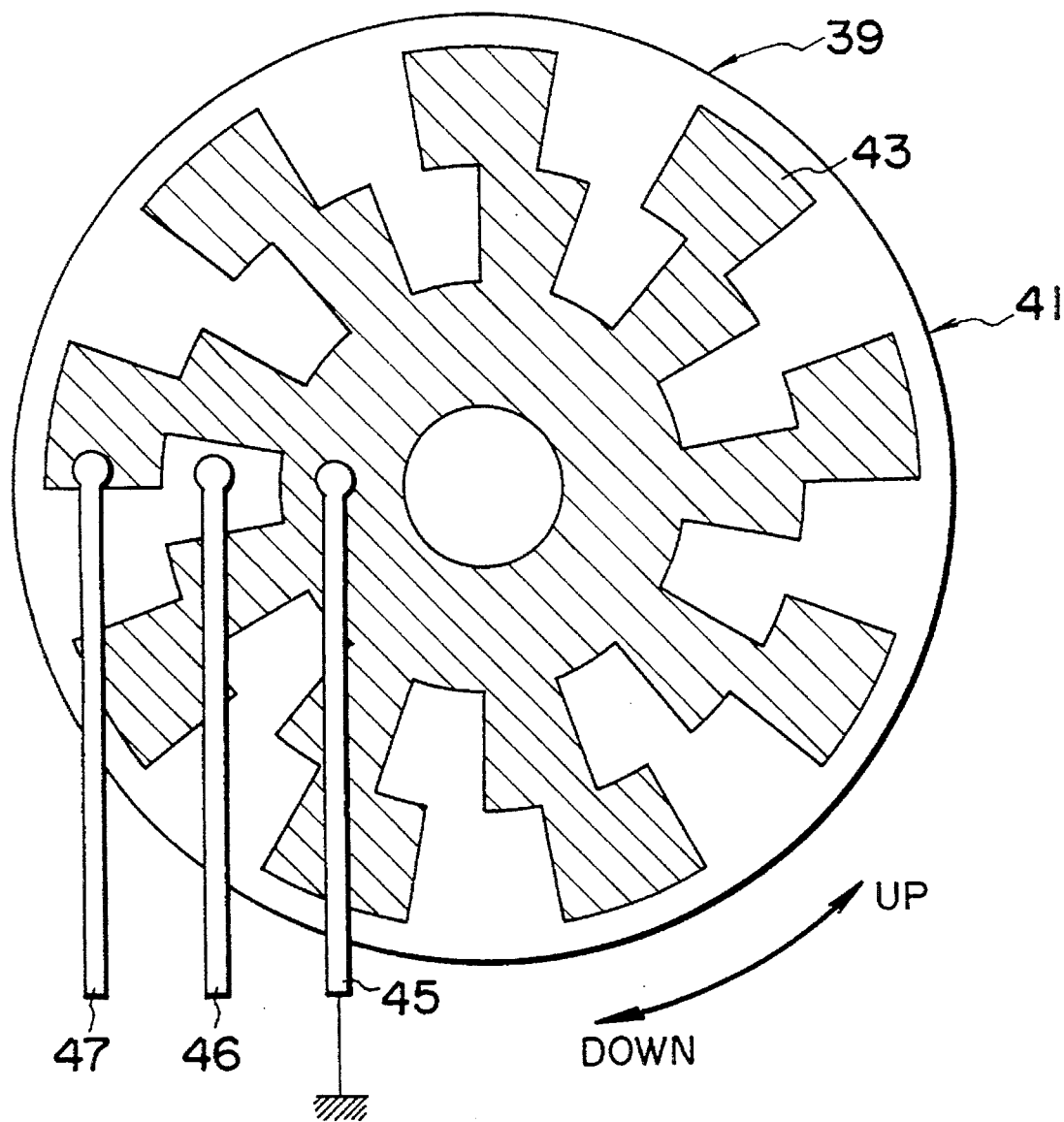
FIG. 3 is a plan view of a phase generating device, linked with a first shutter dial shown in FIG. 1.

FIG. 3 shows the details of a phase generating device 39 positioned below the first shutter dial 17, shown in FIG. 1, for detecting the rotating direction thereof, wherein a rotary member 41 rotates in linkage with the first shutter dial 17.

Said rotary member 41 bears a conductive pattern 43, which is in contact with three contacts 45, 46, 47. The contact 45 is provided for grounding.

The contacts 46, 47 are mutually independent, and constitute switches for activating other circuits when communicated with the contact 45.

A signal A-ON is generated when the contact 47 communicates with the contact 45, while a signal B-ON is generated when the contact 46 communicates with the contact 45.

Figure 4:
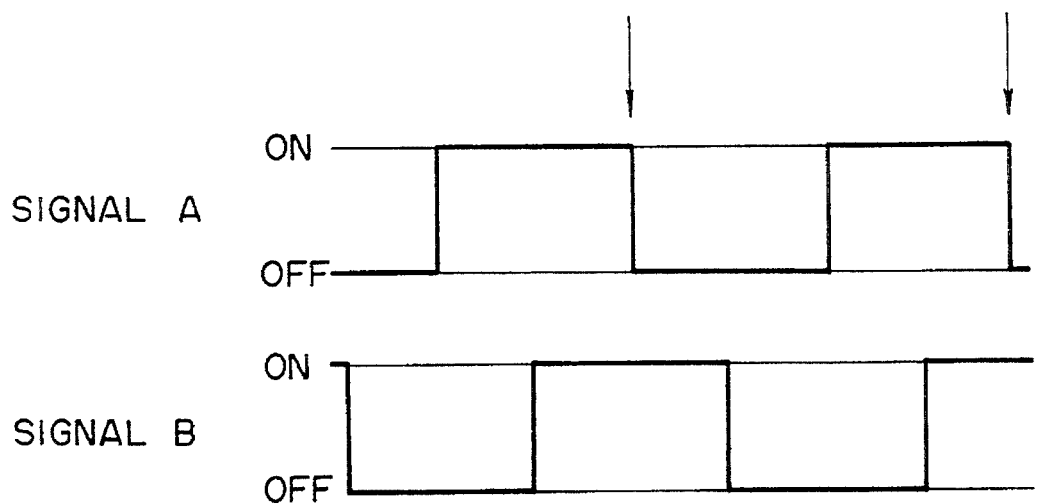
FIG. 4 is a chart showing the output state of addition signals by the phase generating device shown in FIG. 3.

When the rotary member 41 is rotated in a direction UP in FIG. 3, the signals A and B are generated in pulses as shown in FIG. 4, and an addition signal is generated if the signal B is "on" when the signal A changes from "on" to "off" at a click position indicated by an arrow in FIG. 4.

Figure 5:
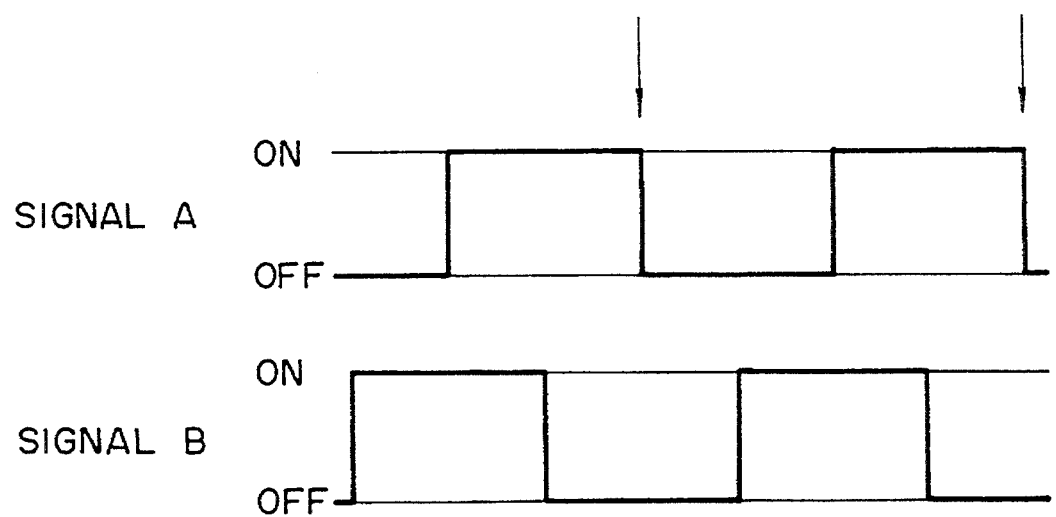
FIG. 5 is a chart showing the output state of subtraction signals by the phase generating device shown in FIG. 3.

On the other hand, when the rotary member 41 is rotated in a direction DOWN in FIG. 3, the signals A and B are generated in pulses as shown in FIG. 5, and a subtraction signal is generated if the signal B is "off" when the signal A changes from "on" to "off" at a click position indicated by an arrow in FIG. 5.

Figure 6:
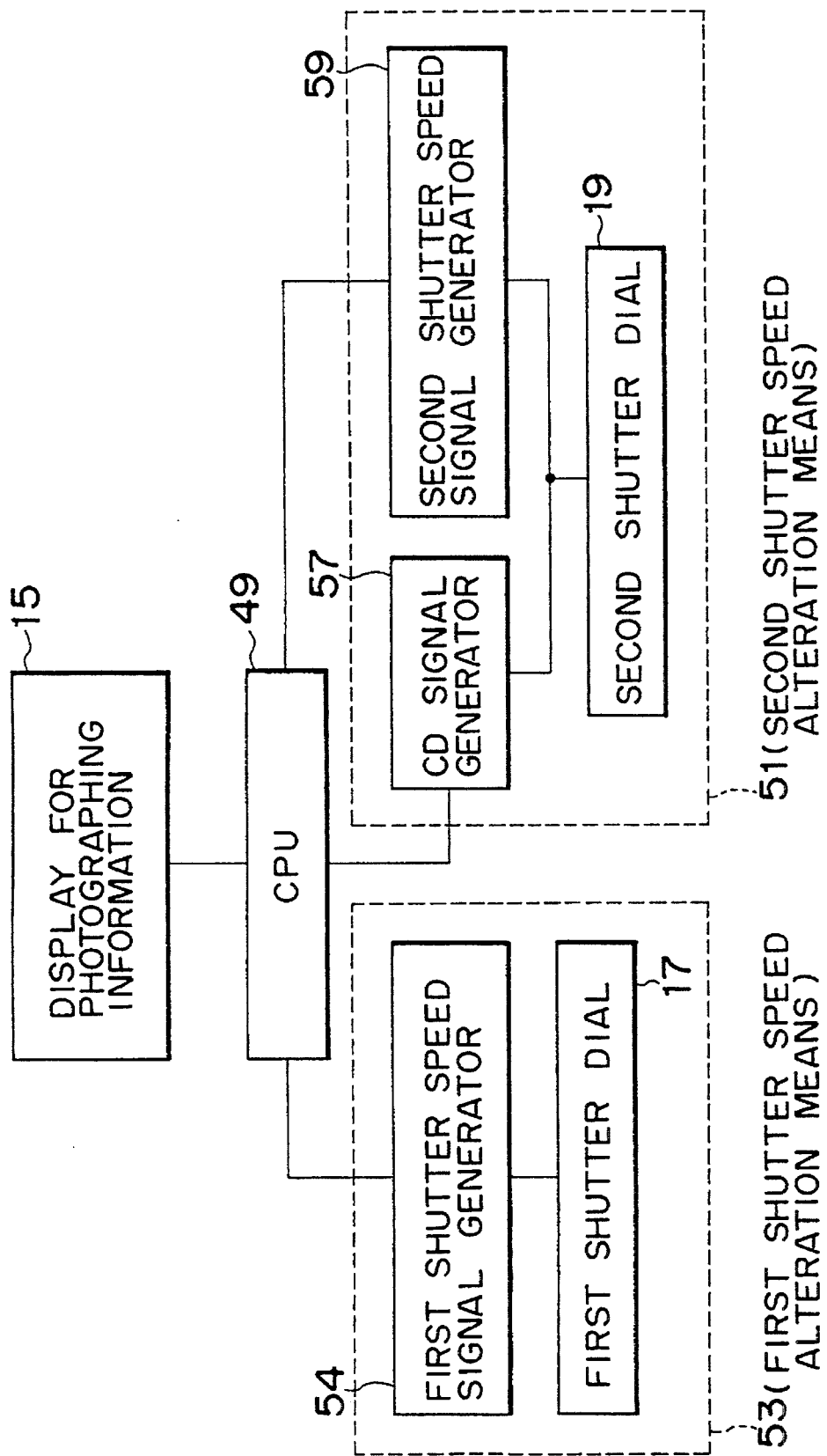
FIG. 6 is a block diagram of the photographing information setting device in the camera shown in FIG. 1.

FIG. 6 is a block diagram of the photographing information setting device of the camera of the present embodiment, including a microcomputer (CPU) 49 for controlling the entire photographing information setting device.

The second shutter dial 19 constitutes an operation member of second shutter speed alteration means 51.

When the index 21 (CD) of the second shutter dial 19 is not positioned at the position indicator 23, said alteration means 51 is rendered active to the CPU 49, and a second shutter speed signal generator 59 supplies the CPU 49 with a signal corresponding to the number positioned at the position indicator 23, whereby the corresponding shutter speed is set.

The first shutter dial 17 constitutes an operation member for first shutter speed alteration means 53.

Said means 53 is rendered active to the CPU 49 when the index 21 of the second shutter dial 19 is positioned at the position indicator 23 whereupon a CD signal generator 57 sends a signal indicating the CD position to the CPU 49. Thus, in response to the rotation of the first shutter dial 17, a first shutter speed signal generator 54, including the phase generation device 39, sends an addition signal or a subtraction signal to the CPU 49 which in response sets the shutter speed.

The shutter speed thus set is supplied to a photographing information display unit 15 and is displayed thereon. Said display is made only when the power supply of the camera is turned on.

Figure 7:
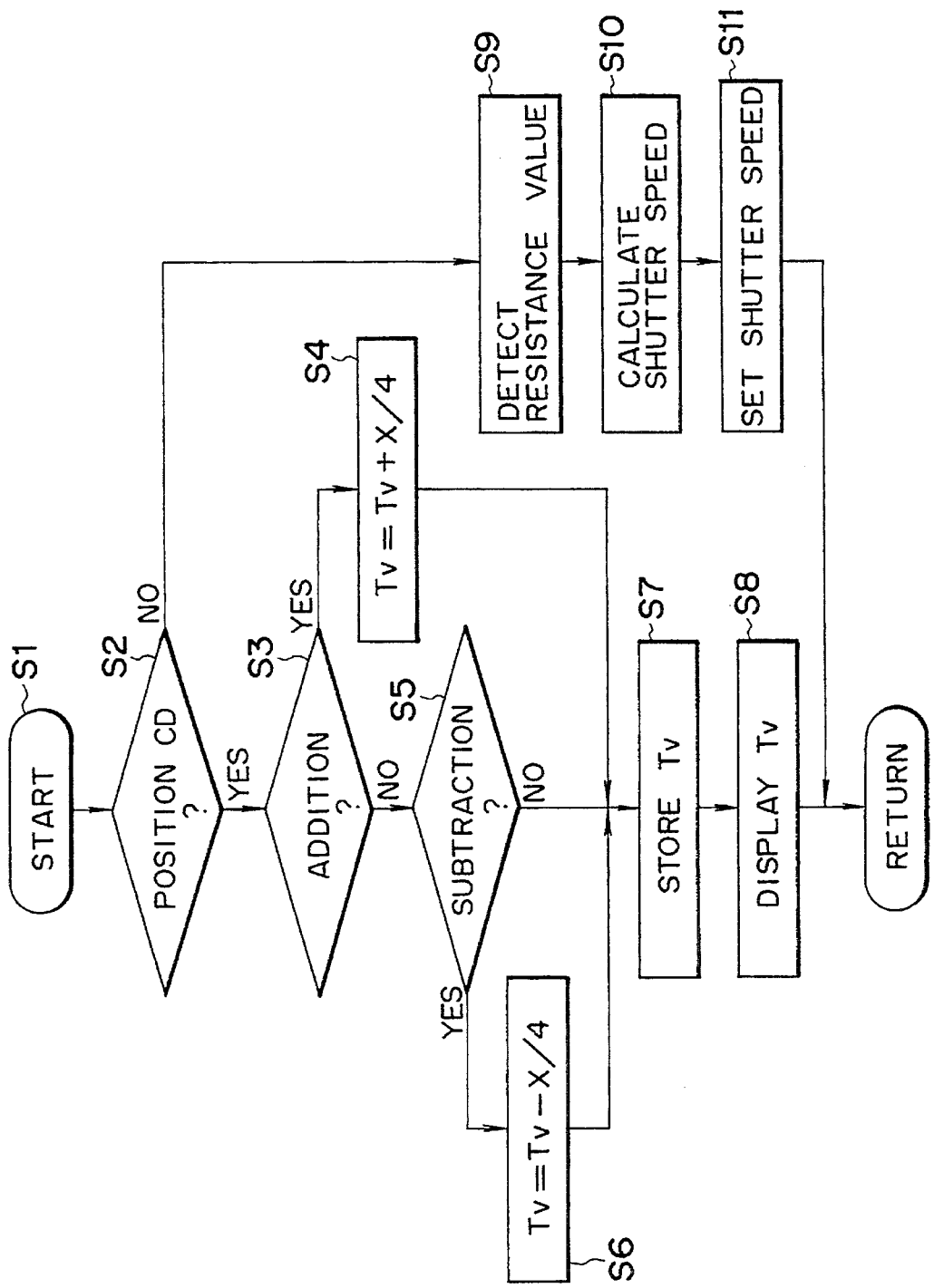
FIG. 7 is a flow chart showing the control sequence of the photographing information setting device in the camera shown in FIG. 6.

FIG. 7 is a flow chart showing a shutter speed setting sequence executed by the above-explained photographing information setting device.

A step S1 corresponds to a state in which the power supply of the camera is turned on and the shutter release button 13 is depressed by a half stroke.

A step S2 discriminates whether the index 21 of the second shutter dial 19 is positioned at the position indicator 23, by detecting whether a signal is released from the CD signal generator 57. The sequence proceeds to a step S3 or S9, respectively if the index 21 is positioned at the position indicator 23 or not.

When the index 21 of the second shutter dial 19 is positioned at the position indicator 23, the first shutter speed alteration means 53 is rendered active, and, in response to the rotation of the first shutter dial 17, an addition signal or a subtraction signal is sent from the first shutter speed signal generator 54 to the CPU 49.

The step S3 discriminates whether the signal from the first shutter speed signal generator 54 is an addition signal, and the sequence proceeds to a step S4 or S5 respectively if said signal is an addition signal or a subtraction signal.

In the step S4, since the signal from the first shutter speed signal generator 54 is an addition signal, there is executed a calculation of adding EV/4 per addition signal, to the currently set shutter speed Tv.

In FIG. 7, X indicates a case of entry of X addition signals.

In this embodiment, the initial value of the shutter speed Tv is the value Tv memorized in the CPU 49 in a previous cycle, in a step S7 to be explained later.

The step S5 discriminates whether the signal from the first shutter speed signal generator 54 is a subtraction signal, and the sequence proceeds to a step S6 or S7 respectively if it is a subtraction signal or an addition signal.

In the step S6, since the signal from the first shutter speed signal generator 54 is a subtraction signal, there is executed a calculation of subtracting Ev/4 per subtraction signal, from the currently set shutter speed Tv.

The step S7 memorizes the shutter speed Tv calculated in the step S4 or S6.

A step S8 displays the shutter speed calculated in the step S4 or S6 on the photographing information display unit 15.

In a step S9, in which the second shutter speed alteration means 51 is rendered active since the index 21 of the second shutter dial 19 is not at the position indicator 23, the resistance of the variable resistor shown in FIG. 2 is detected.

Then a step S10 calculates the shutter speed, based on said resistance of the variable resistor.

A step S11 then sets the shutter speed, calculated in the step S10, in the CPU 49.

In the above-explained photographing information setting device, if a highly precise shutter speed is not required, a signal is released only by the manipulation of the externally operable second shutter dial 19, bearing visibly written shutter speeds, and the shutter speed is set by said signal. In this case the shutter speed can be confirmed regardless of whether the power supply of the camera is turned on or not. On the other hand, if a highly precise shutter speed is required, the index 21 of the second shutter dial 19 is set at the position indicator 23, whereby the shutter speed is set by a signal generated by the operation of the first shutter dial 17, so that the shutter speed can be securely, rapidly and finely set according to the desired purpose.

Thus, in the photographing information setting device explained above, coarse shutter speed setting can be achieved by the second shutter dial 19 while fine shutter speed setting can be achieved by the first shutter dial 17, so that secure, rapid and fine setting of the shutter speed is rendered possible according to the purpose of setting.

Also since the second shutter dial 19 bears visibly printed shutter speeds, it is rendered possible to confirm the coarse shutter speed regardless of whether the power supply of the camera is turned on or not.

Besides, since the second shutter dial 19 sets the shutter speed in relatively large steps, the variable resistor shown in FIG. 2 can be simplified, so that the camera can be made compact.

Also as the first shutter dial 17 is capable of fine shutter speed setting, it is rendered possible to easily select shutter speeds which have been difficult to select in the conventional devices, such as 27 seconds or 31 seconds.

Furthermore, in this photographing information setting device, since the shutter speed is varied by addition signals or subtraction signals generated according to the amount of manipulation of the first shutter dial 17, the shutter speed can be securely, rapidly and finely set according to the desired purpose of setting.

Figure 8:
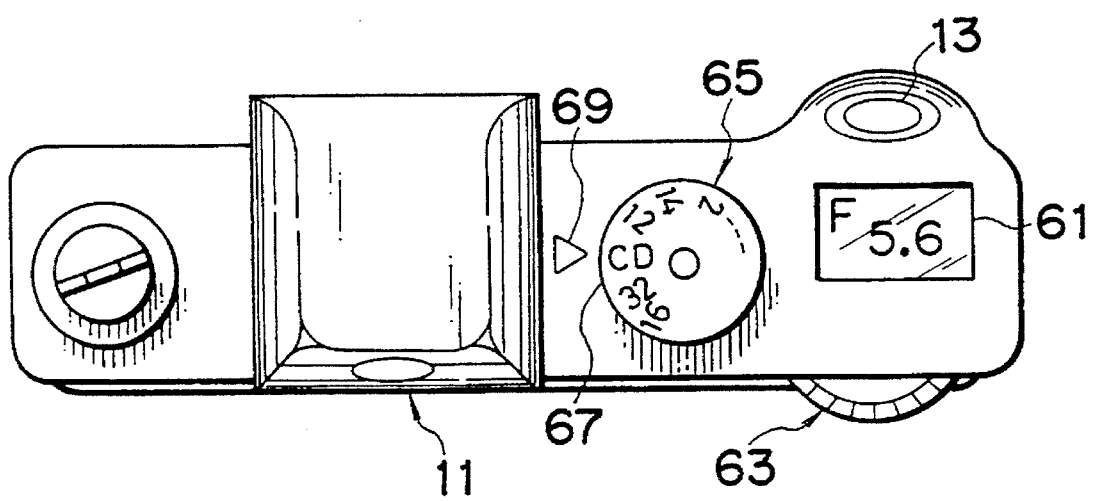
FIG. 8 is a plan view of a camera equipped with another embodiment of the photographing information setting device of the present invention.

FIG. 8 shows a camera equipped with another embodiment of the photographing information setting device of the present invention. In this embodiment, on an upper face of the camera body 11, there are provided a shutter release button 13 and a photographing information display unit 61, composed for example of a liquid crystal display, for indicating the diaphragm aperture value.

There are also provided a first diaphragm aperture dial 63, and a second diaphragm aperture dial 65 bearing thereon, in visibly printed form, diaphragm aperture values and an index "CD" 67.

A position indicator 69 is printed on the camera body, at a side of said second diaphragm aperture dial 65.

Figure 9:
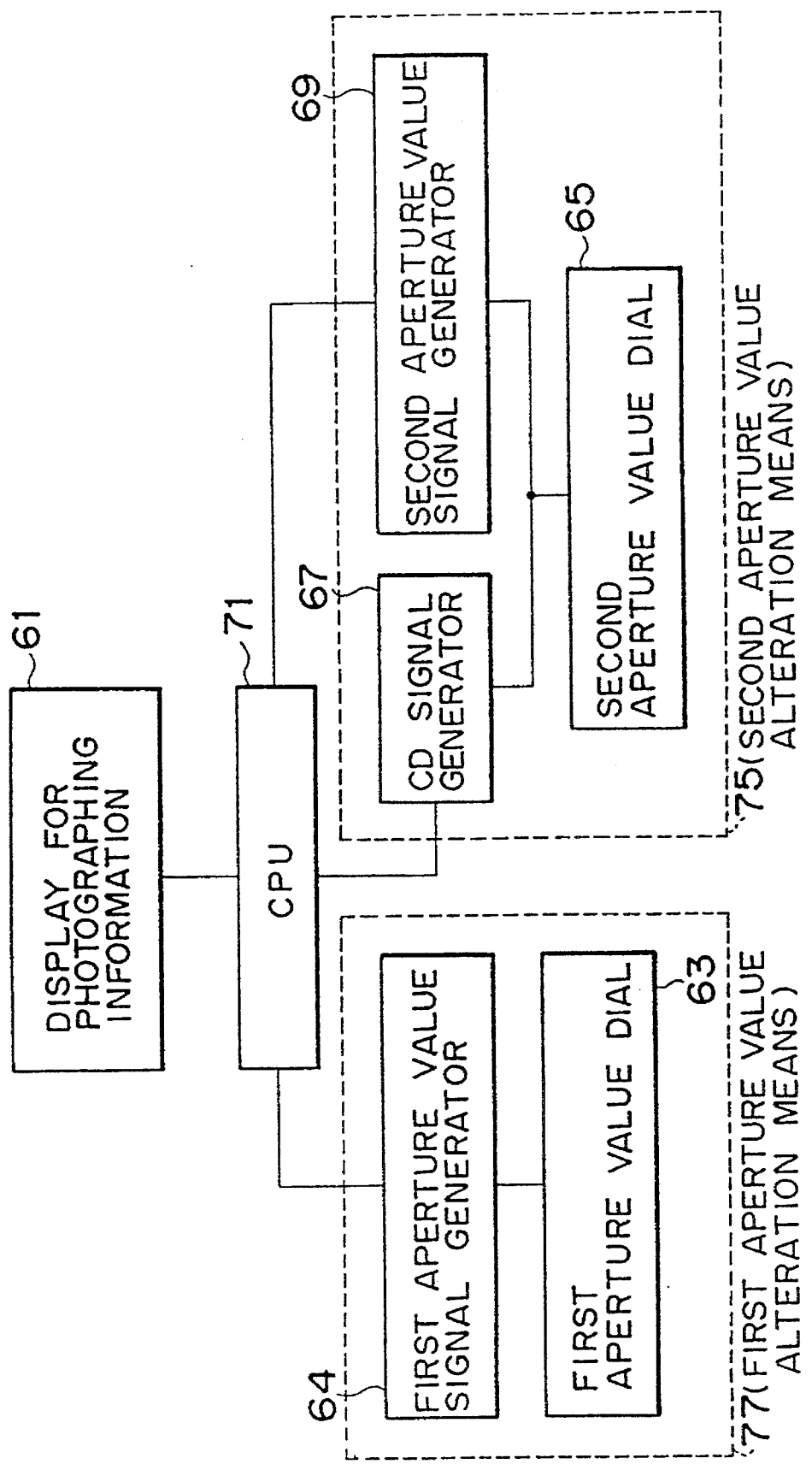
FIG. 9 is a block diagram of the photographing information setting device in the camera shown in FIG. 8.

FIG. 9 is a block diagram of the photographing information setting device of the present embodiment, including a microcomputer (CPU) 71 for controlling the entire device.

The second diaphragm aperture dial 65 constitutes an operation member for second diaphragm aperture value alteration means 75.

When the index 67 of the second aperture value dial 65 is not positioned at the position indicator 69, said alteration means 75 is rendered active to the CPU 71, whereupon a second aperture value signal generator 69 supplies the CPU 71 with a signal corresponding to a value positioned at the position indicator 69, and the aperture value is set according to said signal.

The first aperture value dial 63 constitutes an operation member for first aperture value alteration means 77.

When the index 67 of the second aperture value dial 65 is positioned at the position indicator 69 whereby a CD signal generator 67 sends a signal, indicating the CD position, to the CPU 71, said first aperture value alteration means 77 is rendered active to the CPU 71, and, in response to the rotation of the first aperture value dial 63, an addition signal or a subtraction signal is generated from a first aperture value signal generator 64, including a phase generation device (not shown), and the aperture value is set by the CPU 71.

The aperture value thus set is supplied to the photographing information display unit 61.

The control sequence of the present embodiment will not be explained in detail as it is basically the same as that in the foregoing embodiment, except that the shutter speed is replaced by the aperture value.

The above-explained photographing information setting device enables secure, rapid and fine setting of the diaphragm aperture value according to the desired purpose, and allows a photographer to confirm the coarse aperture value regardless of whether the power supply of the camera is turned on or not.

In the foregoing embodiments, the initial value of the shutter speed Tv is selected at the value Tv memorized in the CPU 49 in the preceding cycle, but the present invention is not limited to such embodiments. For example, it is naturally possible to memorize a most frequently used shutter speed, for example 1/250 sec., in advance in the CPU 49 and to use said shutter speed as the initial value of the shutter speed Tv.

In such case, it is also possible to further improve the operability, by providing the second shutter dial with two CD indexes at the high speed side and at the low speed side, for which the shutter speed is respectively set, for example, at 1/250 sec. and at 1/2 sec.

It is also possible to provide the second shutter dial with two CD indexes of a coarse side and a fine side, and to vary the shutter speed by the first shutter dial by a step of ½ when the index of coarse side is selected but to vary the shutter speed by a step of ¼ when the index of fine side is selected.

As explained in the foregoing, in the photographing information setting device of the present invention, if highly precise photographing information is not required, a second signal is generated by the manipulation of only the externally operable second operation member, bearing visibly confirmable photographing information, and the photographing information is set according to said second signal, while, if highly precise photographing information is required, the second operation member is set at a predetermined position to generate a third signal, whereupon the photographing information is set according to a first signal generated by the manipulation of an externally operation first operation member. It is thus rendered possible to securely, rapidly and finely set the photographing information according to the desired purpose of setting, and to confirm photographing information regardless of whether the power supply of the camera is turned on or not.

Also by forming said first signal as an addition signal or a subtraction signal generated according to the amount of manipulation of the first operation member, the photographing information can be altered according to such signal, so that the photographing information can be securely, rapidly and finely set according to the desired purpose of setting.

When said device is used for shutter speed setting, the shutter speed can be securely, rapidly and finely set according to the desired purpose of setting, and coarse shutter speed can be confirmed regardless of whether the power supply of the camera is turned on or not.

When said device is used for diaphragm aperture value setting, the aperture value can be securely, rapidly and finely set according to the desired purpose of setting, and cause aperture value can be confirmed regardless of whether the power supply of the camera is turned on or not.

What is claimed is:

1. A photographing information setting device of a camera comprising:

first signal outputting means for outputting, in response to an operation of an externally operable first operation member, a first signal for varying photographing information of a predetermined kind by a predetermined step;

second signal outputting means for outputting, in response to an operation of an externally operable second operation member which is different from said first operation member, a second signal for varying the same photographing information as the last-mentioned photographing information by another step different from said predetermined step;

third signal outputting means for outputting a third signal when said second operation member is set to a predetermined position; and photographing information setting means for setting said photographing information either according to said first signal when said third signal outputting means is outputting said third signal, or according to said second signal when said third signal outputting means is not outputting said third signal.

2. A photographing information setting device according to claim 1, wherein said first signal is an addition signal generated, when said first operation member is operated in a predetermined direction, according to the amount of operation thereof, or a subtraction signal generated, when said first operation member is operated in another direction, according to the amount of operation thereof.

3. A photographing information setting device according to claim 1, further comprising display means for displaying the set information when the photographing information is set according to said first signal.

4. A photographing information setting device according to claim 2, further comprising display means for displaying the set information when the photographing information is set according to said first signal.

5. A photographing information setting device according to claim 1, wherein the set photographing information controls shutter speed.

6. A photographing information setting device according to claim 2, wherein the set photographing information controls shutter speed.

7. A photographing information setting device according to claim 3, wherein the set photographing information controls shutter speed.

8. A photographing information setting device according to claim 4, wherein the set photographing information controls shutter speed.

9. A photographing information setting device according to claim 1, wherein the set photographing information controls diaphragm aperture value.

10. A photographing information setting device according to claim 2, wherein the set photographing information controls diaphragm aperture value.

11. A photographing information setting device according to claim 3, wherein the set photographing information controls diaphragm aperture value.

12. A photographing information setting device according to claim 4, wherein the set photographing information controls diaphragm aperture value.

13. A device according to claim 1, wherein said predetermined step is smaller than said another step.

14. A device according to claim 1, wherein said second operation member has a display portion which always visibly displays the photographing information set by said second operation member.

15. A method for setting photographing information of a camera comprising:

generating, by a first signal generating portion, and in response to an operation of a first operation member, a signal for varying photographing information of a predetermined kind by a predetermined step;

generating, by a second signal generating portion, and in response to an operation of a second operation member, a signal for varying the same photographing information as the last-mentioned photographing information by another step different from said predetermined step;

stopping, when said second operation member is set to a predetermined position, generation of said second signal by said second signal generating portion and generating a third signal by a third signal generating portion;

setting, when said first operation member is operated under a condition that said third signal is generated, photographing information by a photographing information setting portion in accordance with said first signal; and setting, when said second operation member is operated under a condition that said third signal is not generated, said photographing information by said photographing information setting portion in accordance with said second signal.

16. A method according to claim 15, wherein said predetermined step is smaller than said another step.

17. A photographing information setting device of a camera comprising:

photographing information varying means including:

an externally operable operation mechanism;

a first signal outputting portion for outputting first signal for varying photographing information of a predetermined kind by a predetermined step;

a second signal outputting portion for outputting a second signal for varying the same photographing information as the last-mentioned photographing information by another step different from said predetermined step;

a third signal outputting portion for generating third signal when said operation mechanism is set to a predetermined position; and photographing information setting means for setting said photographing information either according to said first signal when said third signal generating means is generating said third signal, or according to said second signal when said third signal generating means is not generating said third signal;

wherein said operation mechanism includes:

a first operation member which is externally operable and causes said first signal outputting portion to output said first signal in response to the operation thereof;

a second operation member which is externally operable and causes said second signal outputting portion to output said second signal in response to the operation thereof and and wherein, when said second operation member is set to a predetermined position, said third signal outputting portion outputs said third signal.

18. A device according to claim 17, wherein said predetermined step is smaller than said another step.

19. A method for setting photographing information of a camera comprising:

outputting, when a predetermined operation is made on a photographing information setting means, a signal for varying photographing information of a predetermined kind by a predetermined step;

outputting, when an operation different from said predetermined operation is made on the photographing information setting means, another signal for varying the same photographing information as the last-mentioned photographing information by another step different from said predetermined step;

outputting a further signal when said predetermined operation is made; and setting the photographing information by said photographing information setting means according to the first-mentioned signal when said further signal is outputted, or according to said another signal when said further signal is not outputted.

20. A method according to claim 19, wherein said predetermined step is smaller than said another step.

* * * * *